US011278830B2

(12) United States Patent
Guy et al.

(10) Patent No.: US 11,278,830 B2
(45) Date of Patent: Mar. 22, 2022

(54) FILTERWELL CARTRIDGE HOLDER

(71) Applicant: KING TECHNOLOGY INC., Hopkins, MN (US)

(72) Inventors: David Guy, Maple Grove, MN (US); Jeffrey D Johnson, Edina, MN (US); Paul Freeberg, South St. Paul, MN (US); Terry Goeman, Minnetonka, MN (US); Lyle Enderson, Maple Grove, MN (US); Darrin Swagel, Minnetonka, MN (US); Eric Barton, Eden, MN (US)

(73) Assignee: KWG TECHNOLOGY INC, Hopkins, MN (US)

( * ) Notice: Subject to any disclaimer, the term of this patent is extended or adjusted under 35 U.S.C. 154(b) by 125 days.

(21) Appl. No.: 16/873,293

(22) Filed: Mar. 11, 2020

(65) Prior Publication Data

US 2020/0282348 A1    Sep. 10, 2020

Related U.S. Application Data

(63) Continuation-in-part of application No. 16/059,977, filed on Aug. 9, 2018, now Pat. No. 10,988,951.

(60) Provisional application No. 62/919,541, filed on Mar. 15, 2019, provisional application No. 62/544,173, filed on Aug. 11, 2017, provisional application No. 62/564,620, filed on Sep. 28, 2017.

(51) Int. Cl.
*B01D 35/30* (2006.01)
*C02F 1/00* (2006.01)
*C02F 103/42* (2006.01)

(52) U.S. Cl.
CPC ............ *B01D 35/306* (2013.01); *C02F 1/004* (2013.01); *C02F 2103/42* (2013.01); *C02F 2201/006* (2013.01)

(58) Field of Classification Search
CPC .... B01D 35/306; B01D 29/21; B01D 37/025; B01D 2201/40; C02F 1/004; C02F 2201/006; C02F 2103/42
USPC ......... 210/167.11, 167.12, 167.19, 205, 206, 210/232; 422/266
See application file for complete search history.

(56) References Cited

U.S. PATENT DOCUMENTS

| | | | | |
|---|---|---|---|---|
| 5,089,127 A * | 2/1992 | Junker | ................... | B01F 1/0027 210/167.11 |
| 5,350,512 A * | 9/1994 | Tang | ........................ | B01F 1/00 210/199 |
| 5,359,769 A * | 11/1994 | Silveri | ................ | C02F 1/46104 29/433 |
| 6,680,026 B1 * | 1/2004 | Denkewicz, Jr. | ....... | E03B 7/074 137/268 |
| 6,685,827 B2 * | 2/2004 | King | ..................... | B01F 1/0027 210/167.11 |
| 7,147,770 B2 * | 12/2006 | King | ..................... | E04H 4/1636 210/97 |

(Continued)

*Primary Examiner* — Fred Prince
(74) *Attorney, Agent, or Firm* — Johnson & Phung LLC

(57) ABSTRACT

A filterwell cartridge holder mountable within a hot tub filterwell with the filterwell cartridge holder having a handhold on one end and a feed pipe connector on an opposite end that is attachable to or removable from a filterwell feed pipe with the filterwell cartridge holder engaging and supporting dispensing cartridges thereon to maintain the dispensing cartridges in a dispensing mode within the filterwell.

29 Claims, 9 Drawing Sheets

(56) References Cited

U.S. PATENT DOCUMENTS

| | | | |
|---|---|---|---|
| 7,347,935 B2* | 3/2008 | King | B01F 1/0027 137/268 |
| 11,008,770 B1* | 5/2021 | Brennan | E04H 4/1236 |
| 2019/0048604 A1* | 2/2019 | Guy | B01F 1/0027 |

* cited by examiner

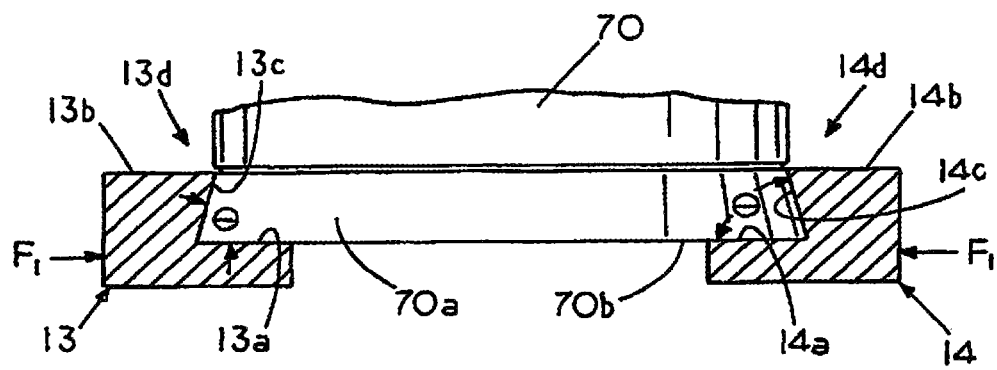
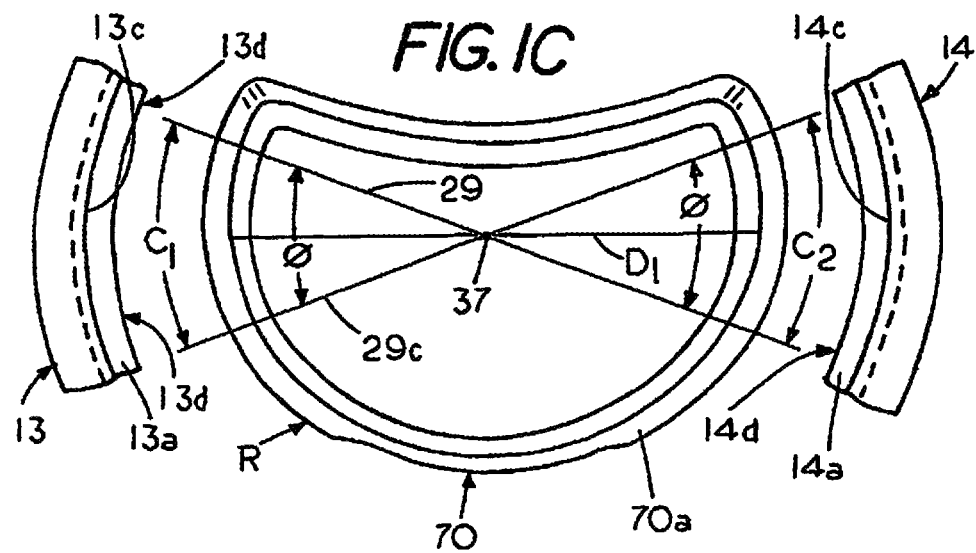

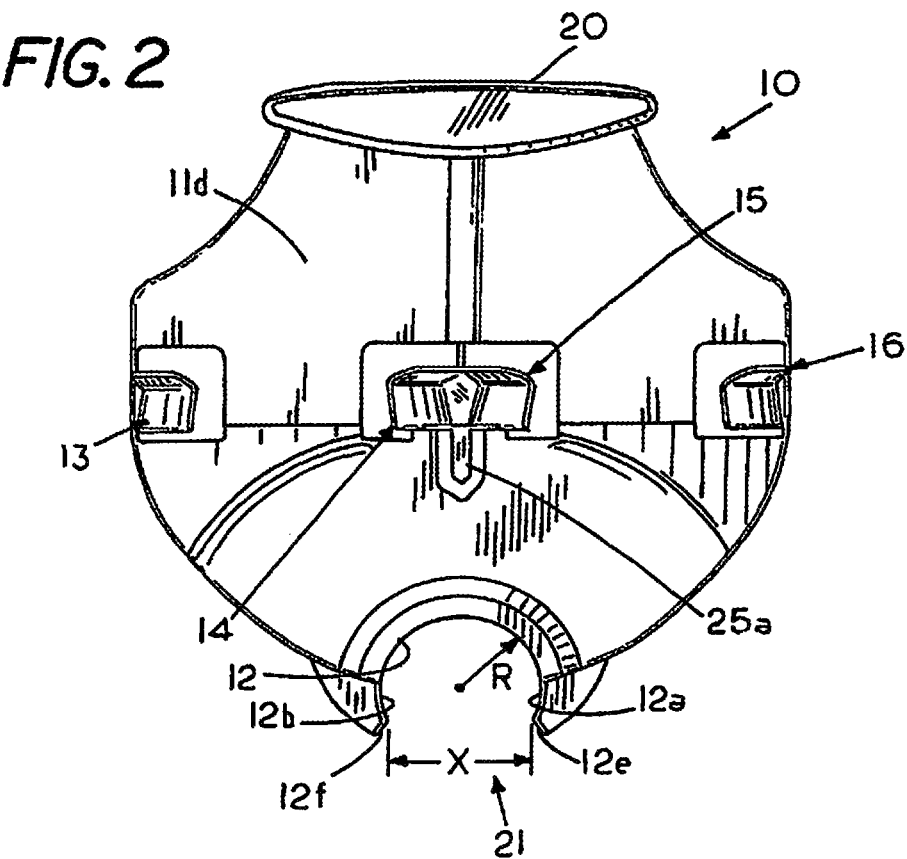
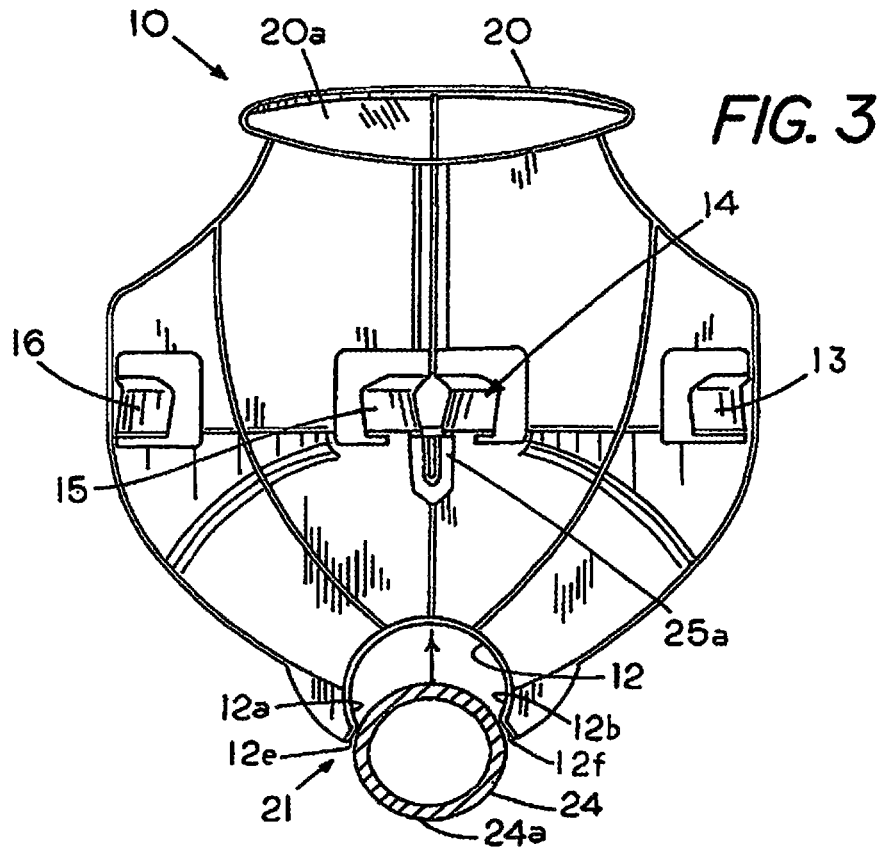

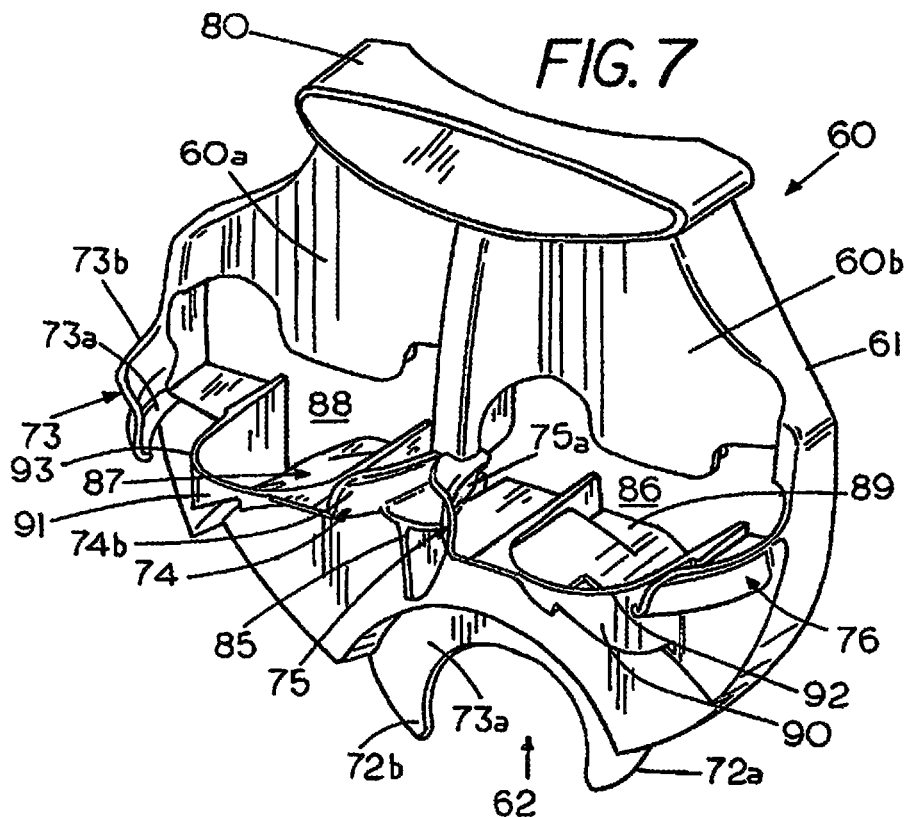
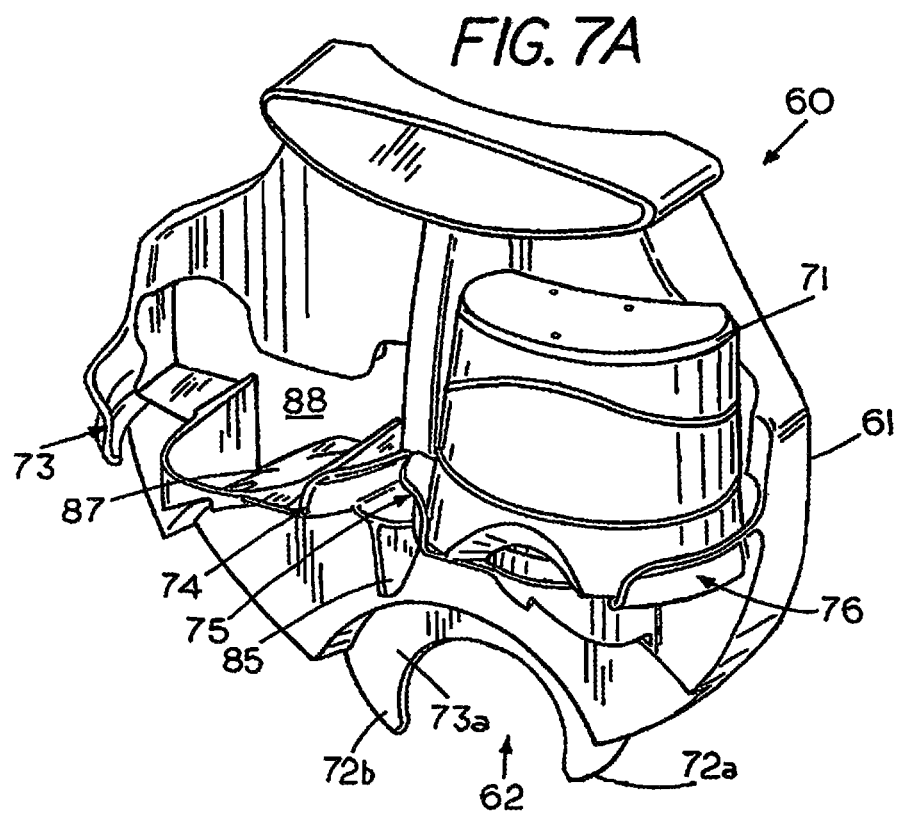

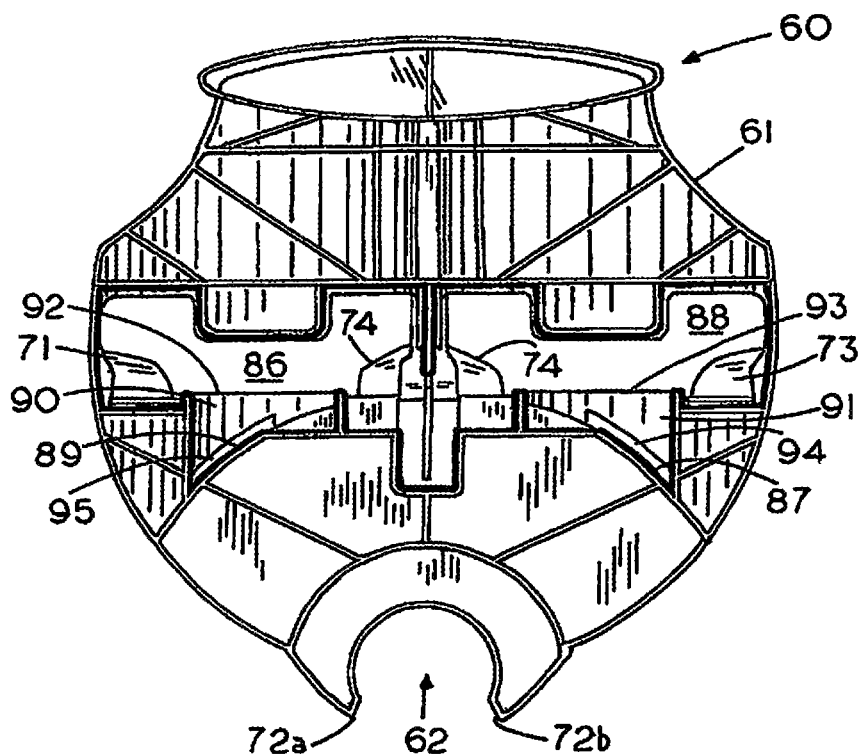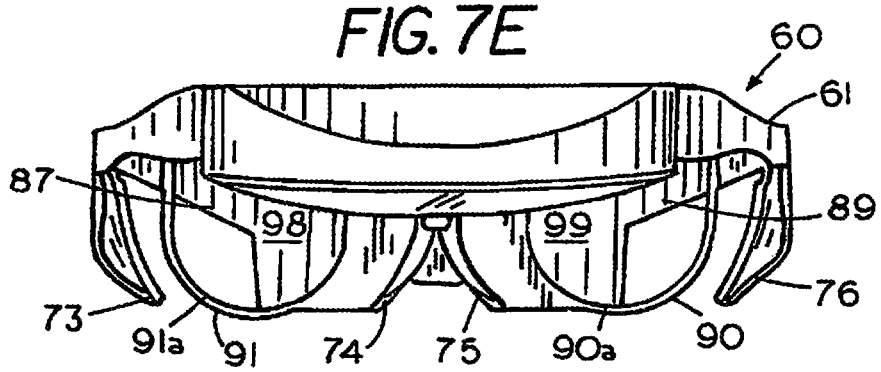

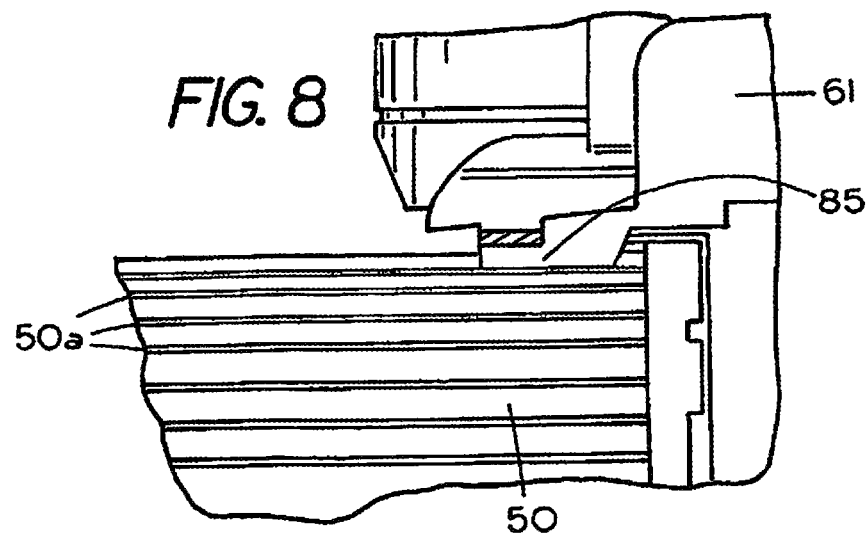
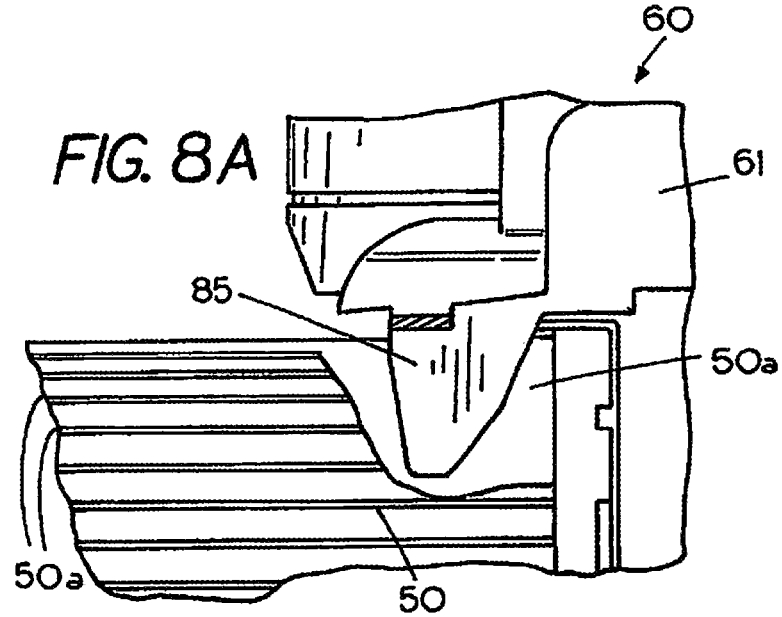
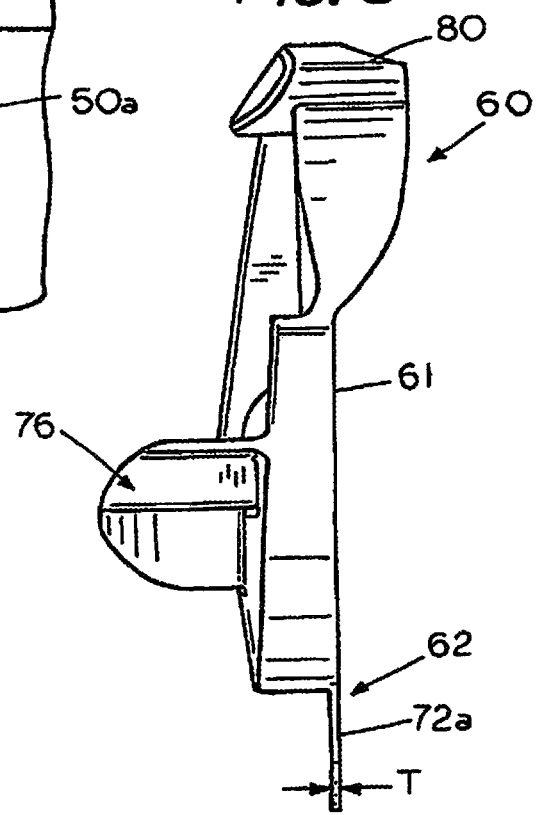

FILTERWELL CARTRIDGE HOLDER

CROSS REFERENCE TO RELATED APPLICATIONS

This application claims priority from provisional application Ser. No. 62/919,541 filed Mar. 15, 2019 and U.S. patent application Ser. No. 16/059,977 filed Aug. 9, 2018, which claims priority from provisional application 62/544,173 filed Aug. 11, 2017 and provisional application 62/564,620 filed Sep. 28, 2007.

STATEMENT REGARDING FEDERALLY SPONSORED RESEARCH OR DEVELOPMENT

None

REFERENCE TO A MICROFICHE APPENDIX

None

BACKGROUND OF THE INVENTION

While the prior art reveals multiple types of dispensing cartridges and cartridge holders useable in various bodies of water one of the more challenging locations for a dispensing cartridge and a dispensing cartridge holder is in the open top filterwell of a hot tub or spa where water flows from a main tub area, where persons sit, into a separate smaller water compartment containing a water filter, with the smaller water compartment referred herein as a filterwell. During hot tub or spa operation the water flows through a water cartridge filter in the filterwell, which removes debris from the water, before returning the water to the main tub area. The location of a dispensing cartridge in the filterwell has the advantage of keeping the dispensing cartridge out of the main tub area of the hot tub or spa and in a region where water flows therethrough; however, the dispensing cartridge needs to be able to reliably deliver disperant into the water as the water flows through the filterwell. To do so the dispensing cartridge preferably should be mounted on a filterwell cartridge holder that is locatable in the filterwell with both the filterwell cartridge holder and the dispensing cartridge thereon having minimal or no interference with the water filtering action within the filterwell.

In addition the flow of water through the filterwell, which is a small compartment where water flow patterns change as a result of change of activity level in the hot tub, can cause a free floating dispensing cartridge or to be tossed about within the filterwell. Such tossing action can affect the delivery rate of the dispensing cartridge as well as cause damage to the water cartridge filter in the filterwell and the dispensing cartridge. To avoid such difficulties both the filterwell cartridge holder and the dispensing cartridge thereon should be stably supported within the filterwell.

In addition, since the consumer needs to periodically replace the dispensing cartridge it is desirable to have convenient access to the filterwell cartridge holder and the dispensing cartridges thereon. That is, the filterwell cartridge holder should support the dispensing cartridges thereon so as to prevent a dispensing cartridge from hitting the walls of the filterwell due to the changing or swirling water flow patterns within the filterwell since either or both the dispensing cartridge or the walls of the filterwell could be damaged. In addition the violent action of the dispensing cartridge being tossed about in the filterwell can generate unwanted noises and improper dispensing rates.

U.S. Pat. No. 5,779,913 describes the mounting of a dispensing cartridge on the end of a stick, which is then placed within the core of a water filter cartridge. Unfortunately, the stick dispenser, which comprises an elongated dispenser with a severable stick on one end, does not prevent the stick dispenser from being buffeted about by water currents within the water cartridge filter. In addition, access to the stick dispensing cartridge, which is located within the water filter core, is inconvenient since the water filter needs be detached to replace the dispensing cartridge. Still other dispensing systems show the attachment of a dispenser cartridge directly to a weir gate or a skimmer basket, which are located outside the filterwell.

While access and stable positioning of the dispensing cartridge and the filterwell cartridge holder within the filterwell is important it is also important that the filterwell cartridge holder can be easily mounted in the filterwell without disruption of the filterwell structure and with minimal interference with the water flow patterns through the filterwell. In addition, the dispensing cartridges supported on the filterwell cartridge holder need to be periodically removed from the filterwell cartridge holder and then replaced with fresh dispensing cartridges.

The filterwell cartridge holder should allow a dispensing cartridge thereon to be easily removed and replaced since the dispensing cartridge may have to be removed from the filterwell cartridge holder to change the dispensing cartridge delivery rate or in some case to replace the dispensing cartridge. Preferably the filterwell cartridge holder should be conveniently positionable and securable within the filterwell and preferably removable or securable therein without the aid of any tools.

SUMMARY OF THE INVENTION

A filterwell cartridge holder mountable within a hot tub filterwell with the filterwell cartridge holder having a handhold on one end and a feed pipe connector on an opposite end with the feed pipe connector having resilient extensions that are attachable to or removable from an exterior surface of a filterwell feed pipe through hand force on the handhold. The filterwell cartridge holder including resilient lateral extensions thereon for lockingly engaging and supporting dispensing cartridges thereon to maintain the dispensing cartridges in a dispensing mode within the filterwell.

BRIEF DESCRIPTION OF THE DRAWINGS

FIG. 1B is a partial sectional view showing a flared base of a dispensing cartridge in engagement with lateral extensions on the filterwell cartridge holder of FIG. 1;

FIG. 1C is an isolated top view of the lateral extensions on the filterwell cartridge holder positioned with respect to a dispensing cartridge;

FIG. 2 is front elevation view of the filterwell cartridge holder of FIG. 1;

FIG. 3 is a back elevation view showing the filterwell cartridge holder of FIG. 1 about to be forcibly engaged with a feed pipe;

FIG. 7 is a front perspective view of a second embodiment of a filterwell cartridge holder;

FIG. 7A is a front perspective view of the a filterwell cartridge holder of FIG. 7 with a dispensing cartridge therein;

FIG. 7D is a rear view of the cartridge holder of FIG. 7;

FIG. 7E is a top view of the cartridge holder of FIG. 7D;

FIG. 8 is an isolated view of a stop on the filterwell cartridge holder extending between the pleats of a water filter cartridge;

FIG. 8A is a cutaway view of stop of FIG. 8 extending between the pleats of the water filter cartridge; and FIG. 9 is a side view of the filterwell cartridge holder of FIG. 7.

DESCRIPTION OF THE PREFERRED EMBODIMENT

Figure 1:
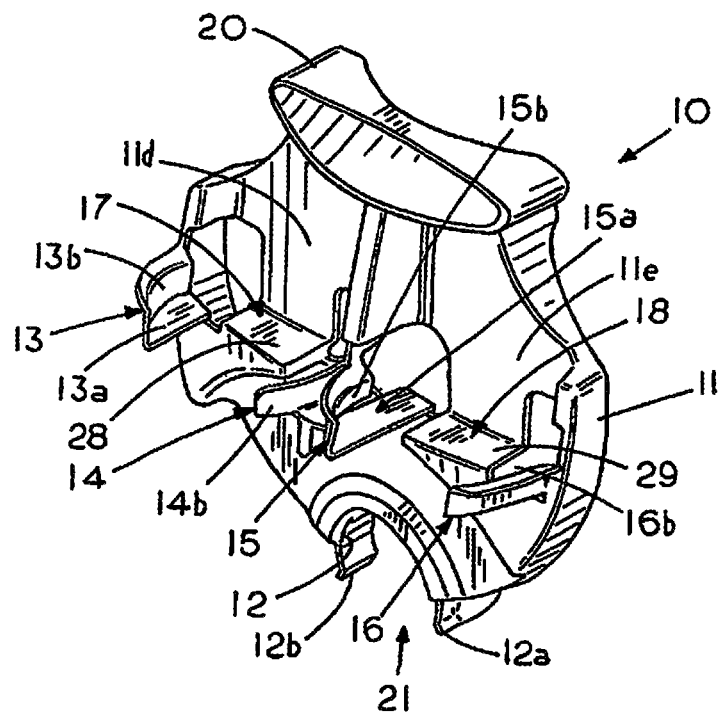
FIG. 1 is a front perspective view of a filterwell cartridge holder.

FIG. 1 is a perspective view of a frictionally mountable filterwell cartridge holder 10 that can hold two dispensing cartridges as the two dispensing cartridges deliver dispersants into a body of water, which is located in a filterwell of a hot tub, spa or the like.

FIG. 2 is a frontal view of the frictionally mountable, filterwell cartridge holder of FIG. 1. The filterwell cartridge holder 10 is mountable on the feed pipe of a water filter cartridge, which is located in a filterwell of a hot tub or spa. The filterwell cartridge holder 10 comprises a housing 11 that includes a handhold 20 on one end and a feed pipe connector 21 on the opposite end with a first arcuate end extension 12a and a second arcuate end extension 12b each resiliently yieldable to allow the feed pipe connector arcuate end extensions 12a and 12b to be slidingly forced into or out of engagement with the filterwell feed pipe 24.

In this example each of arcuate end extension 12a and arcuate end extension 12b have an arcuate face 12 with at least one of the extensions having sufficient resiliency and stiffness so that the arcuate end extension 12a and 12b can be frictionally mated to the feed pipe of a water filter cartridge feed pipe that typically extends in a horizontal direction within a filterwell, such as found in a spa or hot tub. The arcuate end extension 12a and arcuate end extension 12b, which resiliently clamp around feed pipe 24, maintain the filterwell cartridge holder 10 in a stable position proximate the water filter cartridge as water flows through the filterwell and the water filter cartridge yet allow the filterwell cartridge holder to be readily attached or detached from the feed pipe within the filterwell.

On an opposite end of filterwell cartridge holder 10 is a handhold 20 where a person can grasp with his or her hand to bring the feed pipe connector 21 into locking engagement with a feed pipe of a water filter cartridge or alternately to pull the filterwell cartridge holder 10 out of engagement with the feed pipe of the water filter cartridge, which is located in a filterwell of a hot tub, spa or the like. In this example handhold 20 protrudes laterally from the housing, however, other shapes that permit grasping may be used without departing from the spirit and scope of the invention.

The filterwell cartridge holder 10 as shown in FIG. 1 and FIG. 2 includes a first compartment 17 for a first dispensing cartridge and a second compartment 18 for a second dispensing cartridge. The first compartment 17 formed by a first arcuate resilient extension 13 and a second arcuate resilient extension 14 that cantileverly extend laterally outward from housing 11 to form a set of lateral extensions to engage, support and maintain a dispensing cartridge in a dispensing position proximate a water filter cartridge as water swirls and flows through the filterwell in a hot tub or spa.

The filterwell cartridge holder 10 includes a second compartment 18 formed by a first arcuate resilient extension 15 and a second arcuate resilient extension 16 that cantileverly extend laterally outward from housing 11 to form a second set of lateral extensions to engage, support and maintain a further dispensing cartridge in a dispensing position proximate a water filter cartridge as water swirls and flows through the filterwell in a hot tub or spa.

In this example, arcuate resilient extension 13 (FIG. 1A) contains a flat base face 13a for vertically supporting a portion of a bottom face of a dispensing cartridge and an arcuate side extension 13b, which is located at an acute angle to the flat base face 13a to form angular mating engagement with a side face of a dispensing cartridge located therein where the dispensing cartridge has a side face located at an acute angle to a bottom base face of the dispensing cartridge.

Similarly, arcuate resilient extension 14 (FIG. 1A) contains a flat base face 14a for vertically supporting a portion of a bottom face of a dispensing cartridge and an arcuate side extension 14b, which is located at an acute angle to the flat base face 14a to form angular mating engagement with a side face or flared base of a dispensing cartridge located therein where opposite sides of the dispensing cartridge have a side face located at an acute angle to a bottom base face of the dispensing cartridge.

A feature of the invention is that the acutely angled faces of arcuate side extension 13b and arcuate side extension 14b can laterally engage the adjacent faces of a dispensing cartridge located therein with the arcuate side extension 13b and arcuate side extension 14b spreadable to slidingly insert a dispensing cartridge therebetween and resiliently retractable to sandwichingly support the dispensing cartridge therebetween. Housing 10 includes a back wall 11d engageable with a backside of the dispensing cartridge as the arcuate resilient extensions 13 and 14 support a dispensing cartridge in a stable dispensing condition as shown in FIG. 1B.

The acutely angled surfaces of arcuate side extension 15b and flat base face 15a and arcuate side extension 16b and flat base face 16a can also laterally engage the adjacent faces of a further dispensing cartridge located therein with the arcuate resilient extension 15 and arcuate resilient extension 16 spreadable to slidingly insert the further dispensing cartridge therebetween and resiliently retractable to sandwichingly support the further dispensing cartridge in a dispensing condition therebetween with a backside of the further dispensing cartridge also engageable with the back wall 11e of housing 11.

In this example arcuate resilient extension 15 contains a flat base face 15a for vertically supporting a portion of a dispensing cartridge therein and a first arcuate side extension 15b, which is located at an acute angle to the flat base face 15a to form angular mating engagement with an opposite side of a dispensing cartridge that has a sidewall located at an acute angle to a bottom base face of a dispensing cartridge with the mating therebetween restricting lateral as well as both upward and downward vertical displacement of the dispensing cartridge located therein.

Similarly, arcuate resilient extension 16 contains a flat base face 16a for vertically supporting a portion of a dispensing cartridge therein and a first arcuate side extension 16b, which is located at an acute angle to the flat base face 16a to form angular mating engagement with an opposite side of a dispensing cartridge that also has a sidewall located at an acute angle to a bottom base face of the dispensing cartridge with the mating therebetween restricting lateral as well as both upward and downward vertical displacement of the dispensing cartridge located therein.

A feature of the invention is that the adjoining faces of flat base face 15a and arcuate side extension 15b of arcuate resilient extension 15, which are at an acute angle to one another, can support one side of a dispensing cartridge therebetween and the adjoining faces of flat base face 16a and arcuate side extension 16b of arcuate resilient extension 16, which are at an acute angel to one another, can support an opposite side of dispensing cartridge located there between.

In this example the lateral arcuate side extensions 13b and 14b engage the opposite sides of a dispensing cartridge located therein as they resiliently contract to sandwichingly support the dispensing cartridge, which is located therebetween. Similarly, the lateral arcuate side extensions 15b and 16b engage the opposite sides of a further dispensing cartridge located therein as they resiliently contract to sandwichingly support the further dispensing cartridge, which is located therebetween.

Figure 6:
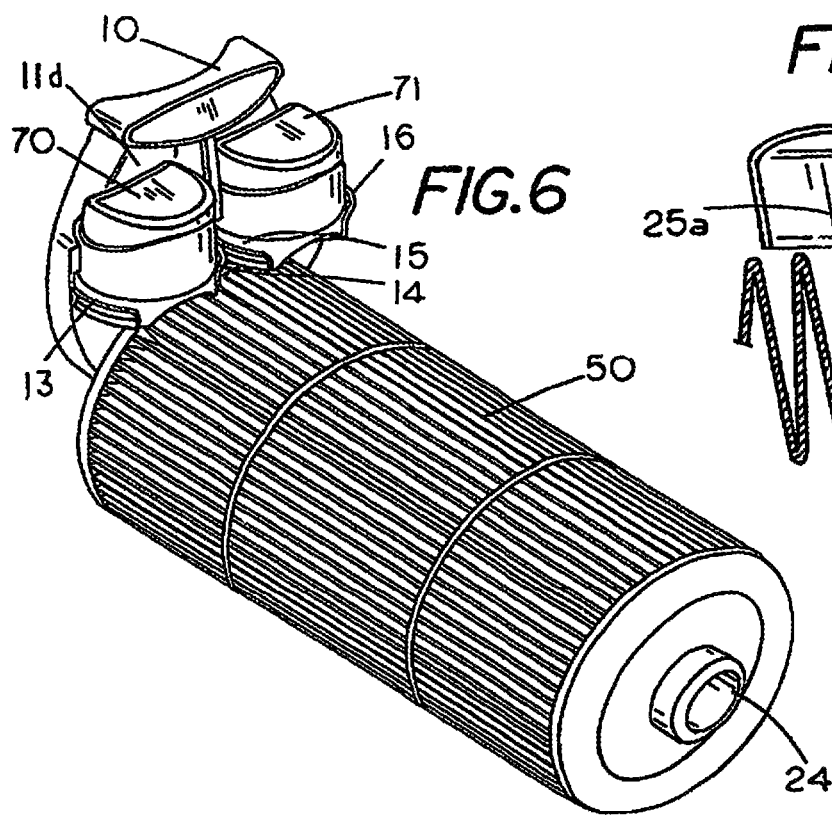
FIG. 6 is a perspective view of the filterwell cartridge holder of FIG. 1 with a pair of dispensing cartridges removable mounted proximate an end of a horizontally extending water filter cartridge.

FIG. 6 is a perspective view of a first dispensing cartridge 70 and a second dispensing cartridge 71 supported on filterwell cartridge holder 10 that is mounted on a feed pipe 24 on a pleated water filter cartridge 50. A further feature of the embodiment shown herein is that lateral arcuate resilient extensions 13 and 14 on the filterwell cartridge holder 10 can flex independent of arcuate resilient extension 15 and 16 to allow one to slide a dispensing cartridge into or out of engagement with the arcuate resilient extensions 13 and 14 on the filterwell cartridge holder while another dispensing cartridge, which is supported by arcuate resilient extension 15 and 16, remains on the filterwell cartridge holder 10 thus allowing one to replace or adjust one dispensing cartridge without having to remove or replace the other dispensing cartridge thereon.

Figure 1A:
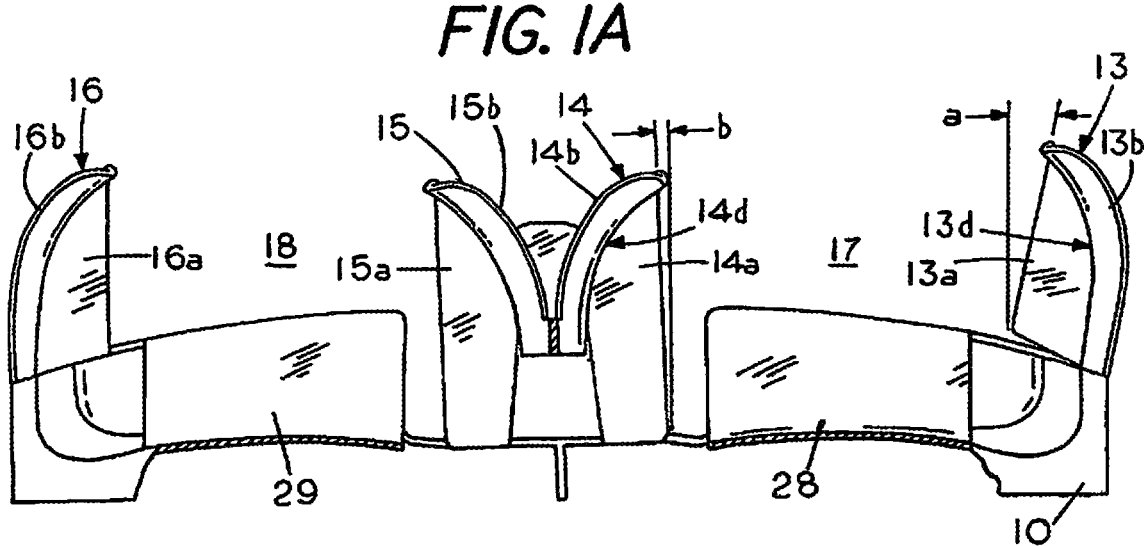
FIG. 1A is an isolated view of lateral extensions on the filterwell cartridge holder of FIG. 1.

FIG. 1A is a partial top sectional view of the filterwell cartridge holder 10 revealing an arcuate resilient extension 13 and an arcuate resilient extension 14 that extend laterally from housing 11 to form compartment 17 and an arcuate resilient extension 15 and an arcuate resilient extension 16 that extend laterally outward from housing 11 to form a further compartment 18 with arcuate resilient extensions 13, 14, 15 and 16 cantileverly and resiliently supported by housing 11.

In this example, arcuate resilient extension 13 and arcuate resilient extension 14 are separable through insertion of a dispensing cartridge therebetween with a subsequent resilient retraction around the dispensing cartridge causing arcuate resilient extension 13 and arcuate resilient extension 14 to sandwichingly support the dispensing cartridge therebetween.

Similarly, arcuate resilient extension 15 and arcuate resilient extension 16 are separable through insertion of a further dispensing cartridge therebetween and subsequent resilient retraction around the further dispensing cartridge causing arcuate resilient extension 15 and arcuate resilient extension 16 to sandwichingly support the further dispensing cartridge therebetween.

FIG. 1A illustrates the outward flexing of arcuate resilient extension 14 through a set of radial lines having a top separation distance "b" and the outward flexing of arcuate resilient extension 13 by a second set of radial lines having a top separation "a. The lateral flexing of arcuate resilient extension 13 with a similar lateral flexing of arcuate resilient extension 14 permitting the lateral insertion of a dispensing cartridge into the compartment 17 to secure the dispensing cartridge therein through the cooperation of arcuate resilient extensions 13 and 14. Similarly, a further dispensing cartridge can be inserted between arcuate resilient extensions 15 and 16 through lateral flexing of arcuate resilient extension 15 and arcuate resilient extension 16 to thereby support side-by-side dispensing cartridges on the filterwell cartridge holder 10 as shown in FIG. 6. While each of arcuate resilient extensions 15 and 16 shown herein are resilient if desired one of each pair of arcuate resilient extensions 15 and 16 may be non-resilient while still being capable of removably supporting a dispensing cartridge therebetween. Similarly, one of each pair of arcuate resilient extensions 13 and 14 may be non-resilient while still being capable of removably supporting the further dispensing cartridge therebetween. That is, while two arcuate resilient extensions 13 and 14 are shown as being resilient in other examples only one of two lateral extensions i.e. arcuate resilient extensions 13 or 14 may be resilient while still permitting one to removably mount and support a dispensing cartridge therebetween without departing from the spirit and scope of the invention.

FIG. 1A also shows a back ledge 28 on housing 11 that supports a portion of a bottom face of a dispensing cartridge therein with flat base face 13a and flat base face 14a providing additional bottom support for the dispensing cartridge located thereon. Similarly, a back ledge 29 on housing 11 supports a portion of a bottom face of the further dispensing cartridge therein with flat base face 15a and flat base face side 16a providing additional bottom support for the further dispensing cartridge located thereon.

FIG. 1B is a partial view of a bottom end of a dispensing cartridge 70 and a sectional view of arcuate resilient extension 13 and arcuate resilient extension 14 of filterwell cartridge holder 10 in engagement with a dispensing cartridge 70. In this example, arcuate side face 13c on filterwell cartridge holder arcuate side extension 13b is in face-to-face engagement with face 70a on one side of dispensing cartridge 70 and an arcuate side face 14c on arcuate side extension 14b is in face to face engagement with face 70a located on the opposite side of the dispensing cartridge 70. The flat base 70b of dispensing cartridge being in face-to-face engagement with flat base face 13a on extension 13 and flat base face 14a on extension 14. In this example side face 70a and the flat base face 70b of dispensing cartridge 70 mate with the flat base face 13a and arcuate side face 13c of extension 13, which are at an acute angle $\Theta$ to each other. Similarly, face 70a and flat base face 70b of dispensing cartridge 70 mate with flat base face 14a and face 14c of arcuate side extension 14b of extension 14, which are also located at an acute angle $\Theta$ to each other, with the mating therebetween coacting to vertically restrain dispensing cartridge 70, which is sandwiched between arcuate resilient extension 13 and arcuate resilient extension 14.

A feature of invention is that a user can quickly mount or unmount a dispensing cartridge from a filterwell cartridge holder, which is located below the water line in the filterwell of a hot tub or the like, through engagement of surface features or faces on the dispensing cartridge and surface features or faces on the filterwell cartridge holder. In the example shown in FIG. 1B and FIG. 1C there at least two arcuate resilient extensions 13 and 14 with arcuate resilient extension 13 having an arcuate side face 13c and flat base face 13a for angularly engaging an adjacent face 70a and bottom face 70b of a dispensing cartridge 70 and arcuate resilient extension 14 having a flat base face 14a and an arcuate side face 14c for also angularly engaging face 70a and adjacent bottom face 70b of dispensing cartridge 70 for securement of the dispensing cartridge 70 therebetween.

To appreciate the surface features on filterwell dispensing cartridge 70 that enable a person to quickly remove or replace a dispensing cartridge that is located in a filterwell reference should be made to FIG. 1B and FIG. 1C. FIG. 1C shows a sectional view of dispenser 70 showing a dispenser rim face 70a in relation to portions of arcuate resilient extension 13 and arcuate resilient extension 14. In this example arcuate resilient extension 13 having an arcuate side extension 13b and a flat base face 13a forming a first cartridge holder socket 13d and arcuate extension 14 having an arcuate side extension 14b and flat base face 14a forming a second cartridge holder socket head 14d to support a dispensing cartridge therebetween.

FIG. 1C shows the geometric center of the convex frontal region of dispenser 70, which is identified by reference numeral 37. To illustrate the facial engagement regions between filterwell cartridge holder 10 and dispensing cartridge 70 references should be made to a first diametrical line 29 and a second diametrical line 29c that extend across rim 70a of cartridge 70. In this example the circumferential region area identified between the right side of the diameter line 29 and diameter line 29a is identified by $C_2$, can interface with filterwell cartridge holder arcuate resilient extension 14, which forms a socket head 14d thereon. Similarly, the circumferential region $C_1$ identified between the left side of the diameter line 29 and diameter line 29c identifies a length $C_1$ can interface with cartridge holder arcuate resilient extension 13, which forms a socket 13d thereon.

FIG. 1B shows the dispensing cartridge 70 cantileverly engaged in a face-to-face condition with a socket 13d in extension 13 and a socket 14d in extension 14. The cantilever engagement supports the dispensing cartridge 70 in a stable dispensing condition within the swirling waters of a filterwell as well as prevents orthogonal displacement i.e. 3 axis lateral displacement of the dispensing cartridge 70 with respect to the cartridge holder arcuate resilient extension 13 and cartridge holder arcuate resilient extension 14.

FIG. 2 shows the filterwell cartridge holder 10 with the feed pipe engaging arcuate face 12 extending over 180 degrees with a first terminal end 12a and a second terminal end 12b separated a distance x from each other that is less than diameter 2R where R is the radius of arcuate face 12. Consequently, the terminal end 12a, which has a canted end face 12e, and terminal end 12b, which has a canted end face 12f, can engage a cylindrical feed pipe in a water filter cartridge and flex outward in response a downward force on filterwell cartridge holder 10 to attach filterwell cartridge holder 10 to a cylindrical feed pipe 24 of diameter 2R. FIG. 3 illustrates that in this example, the resiliency of filterwell cartridge holder 10 combined with the canted end face 12f and canted end face 12e allows one to force filterwell cartridge holder 10 arcuate face 12 into face-to-face engagement with horizontally cylindrical feed pipe 24, which connects to a water filter cartridge located in a filterwell of a hot tub or spa. That is, pushing down on handhold 20 forces the terminal end 12a and terminal end 12b to slide over and around the feed pipe 24 of a water filter cartridge located in the filterwell of a hot tub or spa. Similarly, one can remove the filterwell cartridge holder 10 from the feed pipe 24 by lifting upward on handhold 20, which causes the terminal end 12a and terminal end 12b to spread apart thus disengaging the filterwell cartridge holder 10 from in this example a horizontally extending cylindrical feed pipe 24 of a water filter cartridge. Thus, a feature of the invention is that the filterwell cartridge holder 10 can be quickly attached to or removed from the feed pipe 24 of the water filter cartridge 50 without the aid of any tools.

In this example the resiliency of the material of filterwell cartridge holder 10 allows the two terminal ends 12a and 12b to spread apart and pass around the feed pipe 24 and then collapse to frictionally support the filterwell cartridge holder 10 on feed pipe 24. This type of filterwell cartridge holder attachment is well suitable when the feed pipe 24 extends from a central opening in a horizontal extending water filter 50 and preferably the radius of curvature of feed pipe 24 and the radius of curvature R of the arcuate face 12 an provide interference fit i.e. clamping engagement with feed pipe 24.

Thus, in the example shown the arcuate face 12 is greater than 180 degrees and can be forcibly brought into face to face engagement with a feed pipe 24 through resilient separation of the arcuate resilient extensions 12a and 12b and then brought into clamping engagement through the resilience of extensions 12a and 12b as the holder 10 is forced downward until arcuate face 12 mates with the exterior surface of feed pipe 24.

Figure 4:
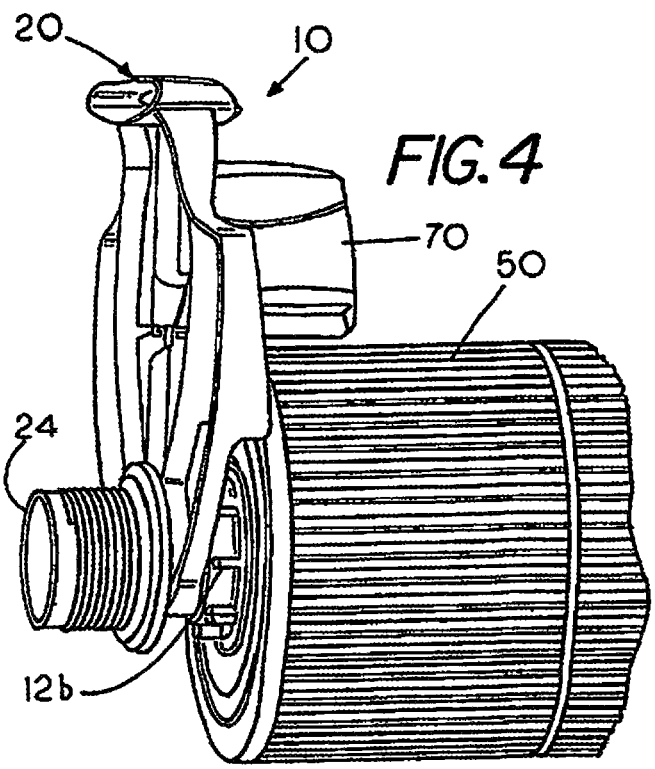
FIG. 4 is a perspective view of the filterwell cartridge holder of FIG. 1 mounted on the end of a feed pipe that extends into a water filter cartridge located in a filterwell.

FIG. 2 and FIG. 3 show a filter engaging stop or extension 25a that can extend between adjacent pleats of a filter cartridge to hold the filterwell cartridge holder 10 in the proper dispensing position, which in this case is in a vertical condition on one end of the filter cartridge as shown in FIG. 4, which is an isolated view of holder 10 mounted on the end of the feed pipe 24 that extends into the water filter cartridge 50 as the arcuate sections 12a and 12b are clamped around feed pipe 24 to frictionally support dispenser holder 10 thereon.

Figure 5:
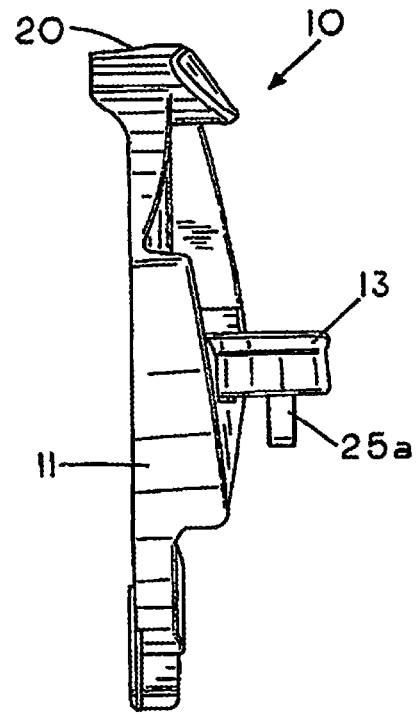
FIG. 5 is a side view of the filterwell cartridge holder of FIG. 1.

FIG. 5 is a side view of the filterwell cartridge holder 10 without a dispensing cartridge therein revealing the cantilevered arm 13 i.e. arcuate resilient extension 13 extending orthogonally outward from the housing 11 and a stop or extension 25a, which is insertable between adjacent pleats on water filter cartridge 50. FIG. 6 is a perspective view showing the filterwell cartridge holder 10 with a first dispensing cartridge 70 and a second dispensing cartridge 71 therein.

Figure 6A:
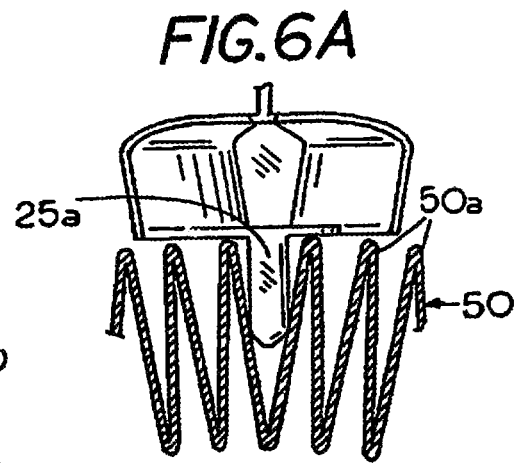
FIG. 6A is an isolated view of the filterwell cartridge holder having a rib extending between adjacent radial pleats in a water filter cartridge.

FIG. 6A is an isolated view showing filter-engaging stop or extension 25a extending between adjacent pleats 50a of a water filter cartridge 50 to hold the filterwell dispenser holder 10 proximate the water cartridge filter 50. FIG. 6 shows a first dispensing cartridge 70 supported on one side of filterwell dispenser holder 10 and a second dispensing cartridge 71 supported on the opposite side of filterwell dispenser holder 10 with the dispensing cartridge 70 and dispensing cartridge 71 symmetrically positioned with respect to the filterwell dispenser holder 10.

FIG. 6 shows the filterwell dispenser holder 10 positioned on the end of an elongated water filter cartridge 50 with the dispensing cartridges 70 and 71 positioned to dispense dispersants such as minerals and a halogen into the water located proximate the water filter cartridge 50 that is located in the filterwell of a hot tub.

A feature of the invention shown herein, which is illustrated in FIG. 3, is the ease in mounting filterwell cartridge holder 10 in the filterwell of a hot tub or spa without the use of tools. In the method described herein one mounts the dispensing cartridge 70 (FIG. 6) thereon through frictional engagement of the dispensing cartridge 70 with the arcuate resilient extensions 13 and 14 as illustrated in FIG. 1B. Similarly, one can mount the dispensing cartridge 71 (FIG. 6) thereon through frictional engagement of the dispensing cartridge 71 with arcuate resilient extension 15 and arcuate resilient extension 16 on housing 11.

With the method described herein one can on-the-go secure a filterwell dispenser holder 10 and dispensing cartridges in a hot tub filterwell through yieldable attachment of one end of filterwell cartridge holder 10 to a feed pipe 24, which is located in a hot tub filterwell, by merely grasping handhold 20 and pushing downward thereon to bring arcuate face 12 on the opposite end of the holder 10 into face to face engagement with the cylindrical feed pipe 24. Once the holder 10 is mounted on feed pipe 24 one can yieldable attach a dispensing cartridge 70 to holder 10 through engagement of dispensing cartridge exterior side face 70a and exterior bottom face 70b, i.e. with socket 13d in arcuate extension 13 and socket 14d in arcuate extension 14. In this method one brings exterior face 70a of the dispensing cartridge 70 into face-to-face engagement with mating faces arcuate resilient extension 13 that form socket 13d and opposing mating faces on arcuate extension 14 that form socket 14d.

Thus, a feature of the invention is that a first dispensing cartridge 70 can be grasped and laterally inserted or removed between a set of arcuate resilient extensions 13 and 14 that are cantilevered and laterally extending outward from the housing 11 and a second dispensing cartridge 71 that can also be grasped and laterally inserted or removed between a further set of arcuate resilient extensions 15 and 16 that are also cantilevered and laterally extending outward from the housing 11. Thus, the two dispensing cartridges 70 and 71 are independently attachable or releasable from housing 11 through hand engagement. In this example the dispersants from dispensers 71 and 70 are released directly into the filterwell in the hot tub since the dispensing cartridges 70 and 71 are maintained below the water line within the filterwell of a hot tub or the like.

To assist in maintaining the orientation of dispenser holder 10 proximate the water filter 50 one may extend a stop or extension 25a on housing 11 between a set of pleats 50a on a water filter cartridge 50, which is located in the filterwell of a hot tub or the like as shown in FIG. 6A. The extension 25a assists in maintaining a fixed orientation of the dispenser holder 10 with respect to the water filter cartridge 50 during operation of the water filter cartridge 50. The extension 25a extends between pleats 50a and in one embodiment extend sufficiently far between the adjacent pleats 50a so as to prevent rotation of the water filter cartridge 50 with respect to the dispenser holder 10 and in another embodiment the extension 25a does not extend so far as to prevent rotation of the water filter cartridge in the event an operator wants to rotate the water filter cartridge 50 with respect to the dispenser holder 10.

As can be seen in FIG. 1B one engages adjacent faces on a dispensing cartridge 70 with adjacent faces on arcuate resilient extensions 13 and 14 on housing 11 where the adjacent faces 70a and 70b on the dispensing cartridge and the adjacent faces on arcuate resilient extension 13 and arcuate resilient extension 14 are located at an acute angle to each other. A further feature is that one can abut a back face of a dispensing cartridge 70 against a face 11d of housing 11, as shown in FIG. 6, to provide back side support for the dispensing cartridge 70. Similarly back face 11e provides backside support for cartridge 71.

FIG. 3 illustrates how one can yieldably attach one end of housing 11 with arcuate extension 12b and 12a to a feed pipe 24 through engaging a canted end face 12e on an arcuate extension 12a and a canted end face 12f on arcuate extension 12b to an exterior surface 24a of the feed pipe 24 in order to flex extension 12a and extension 12b outward to thereby forcible mount housing 11 onto feed pipe 24 through a hand lowering of the housing 11 onto feed pipe 24. Thus, the method includes yieldable attaching a one end of a housing 11 to a feed pipe 24 in a hot tub filterwell while holding onto an opposite end of the housing.

The method can further include yieldable attaching a first dispensing cartridge 70 to the housing 11 through engaging exterior faces 70a and 70b of the dispensing cartridge with the arcuate resilient extensions 13 and 14 of housing 11 of the dispensing cartridge holder 10. The method can further include yieldable attaching a second or further dispensing cartridge 71 to the housing 11 through engaging exterior faces of the second or further dispensing cartridge 71 with the arcuate resilient extensions 15 and 16 of the dispensing cartridge holder 10.

FIG. 7 is a perspective view of a further embodiment of frictionally mountable filterwell cartridge holder 60 that can hold two dispensing cartridges as the two dispensing cartridges deliver dispersants into a body of water, which is located in a filterwell of a hot tub, spa or the like and FIG. 7A is a perspective view of the frictionally mountable, filterwell cartridge holder of FIG. 7 showing a dispensing cartridge 71 mounted thereon.

The filterwell cartridge holder 60 is also mountable on the feed pipe of a water filter cartridge, which is located in a filterwell of a hot tub or spa. The filterwell cartridge holder 60 comprises a housing 61 that includes a handhold 80 on one end and a feed pipe connector 62 comprising a split flange where the split flange includes a first flat arcuate end extension 72a and a second flat arcuate end extension 72b with at least one arcuate end extension resiliently yieldable in a radial direction to allow the feed pipe connector arcuate end extensions 72a and 72b to be slidingly forced into or out of engagement with a portion of cylindrical exterior surface of a filterwell feed pipe 24, which is located between the end of a water filter cartridge and a wall of the filterwell (see FIG. 4 and FIG. 6).

In this example the split flange 62 includes an arcuate end extension 72a and arcuate end extension 72b that have at least one of the end extensions having sufficient resiliency and stiffness so that the arcuate end extension 72a and 72b can be frictionally mated to the outside of face of a water filter cartridge feed pipe, which typically extends in a horizontal direction within a filterwell such as found in a spa or hot tub. That is, by applying a downward force on holder 60 when the flat end extensions 72a and 72b are in perpendicular contact with an exterior surface of a feed pipe located in a filterwell of a hot tub or the like, brings the flat end extensions 72a and 72b into frictional gripping engagement with the feed pipe in a filterwell. In this example the flat arcuate end extension 72a and flat arcuate end extension 72b, which resiliently clamp around feed pipe 24 have a narrow flat profile as referenced by T in FIG. 9 but have sufficient stiffness to remain in engagement with the feed pipe 24 when inserted into the water flow within a filterwell to support the holder 60 therein. The flat extensions 72a and 72b allow the filterwell cartridge holder 60 to be mounted in conditions where there is limited space at the end of the water filter cartridge since the narrow width T of the feed pipe connector 62 permits fitting the extensions into limited end space that is found between end of some water filters and a wall of the filterwell. Thus, both the filterwell cartridge holder 10 and filterwell cartridge holder 60 can be mounted in a stable position proximate the end of water filter cartridge without affecting how water flows through the filterwell as well as allowing the filterwell cartridge holder to be readily attached or detached from a feed pipe within the filterwell. The thickness T is typically on the order of an ⅛ inch or less for a typical polymer plastic, however, if the dispenser holder is one piece the characteristics of material selected for the dispenser holder may determine the minimum thickness T for the feed pipe connector 62.

On an opposite end of filterwell cartridge holder 60 is a handhold 80 where a person can grasp with his or her hand to bring the feed pipe connector 62 into frictional locking engagement with a feed pipe of a water filter cartridge or alternately to pull the filterwell cartridge holder 60 out of frictional locking engagement with the feed pipe of the water filter cartridge, which is located in a filterwell of a hot tub, spa or the like. In this example handhold 80 protrudes laterally from the housing, however, a handhold may be omitted as a top portion of the filterwell cartridge holder housing 61 is hand graspable so that a person can attach or remove the filterwell cartridge holder 60 merely by grasping a top end of housing 61, which is opposite the flanged end of the housing 61, and pushing down on housing 61 to attach or pulling up on housing 61 to remove.

The filterwell cartridge holder 60, which is shown in various views in FIG. 7, FIG. 7A, FIG. 7B, FIG. 7D and FIG. 7E, includes a first dispensing cartridge compartment for releasably holding a first dispensing cartridge therein and a second dispensing compartment for releasably holding a second dispensing cartridge therein.

The first dispensing cartridge compartment formed by a first arcuate resilient extension 73 and a second arcuate resilient extension 74 that cantileverly extend laterally outward from housing 60 to form a first set of lateral extensions to engage, support and maintain a dispensing cartridge in a dispensing position proximate a water filter cartridge as water swirls and flows through the filterwell in a hot tub or spa. Similarly, the filterwell cartridge holder 60 includes a second dispensing cartridge compartment formed by a first arcuate resilient extension 75 and a second arcuate resilient extension 76 that cantileverly extend laterally outward from housing 60 to form a second set of lateral extensions to engage, support and maintain a second dispensing cartridge in a dispensing position proximate a water filter cartridge as water swirls and flows through the filterwell in a hot tub or spa.

In this example shown in FIG. 7 arcuate resilient extension 73 contains a flat base face 73a for vertically supporting a portion of a bottom face of a first dispensing cartridge and an arcuate side extension 73b located at an acute angle to the flat base face 73a to form angular mating engagement with a portion of a portion of a side face of a dispensing cartridge when the dispensing cartridge has a side face located at a mating angle to a bottom base face of the dispensing cartridge. The face mating relationship between a dispensing cartridge and a dispensing cartridge holder is illustrated in FIG. 1B and FIG. 1C.

Similarly, arcuate resilient extension 74 contains a flat base face for vertically supporting a portion of the opposite end of a second dispensing cartridge and an arcuate side extension 74b, which is located at an acute angle to the flat base face attached thereto to form angular mating engagement with a further portion of a side face or flared base of a dispensing cartridge located therein where the opposite sides of the dispensing cartridge supported therein have a side face located at an acute angle to a bottom base face of the dispensing cartridge to provide face mating engagement support through engagement with the side and flat base of the dispensing cartridge located therein.

Figure 7B:
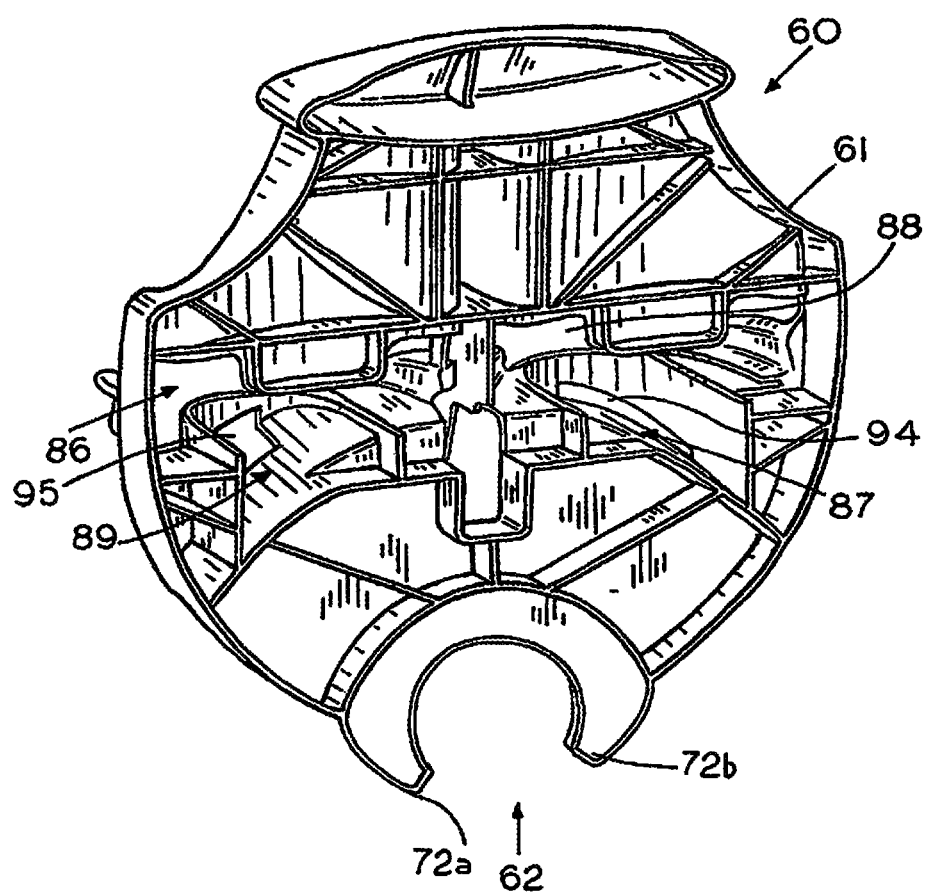
FIG. 7B is a rear perspective view of the a filterwell cartridge holder of FIG. 7.

In the examples shown herein, both the filterwell cartridge holder 60 and filterwell cartridge holder 10 have angled faces and extensions thereon with at least one resilient arcuate side extension that can laterally engage a portion of a face on one side of a dispensing cartridge and a second resilient arcuate side extension that can engage a further portion of a face of the dispensing cartridge that is located therebetween with the arcuate side extensions spreadable to slidingly insert the dispensing cartridge therebetween and retractable to sandwichingly support the dispensing cartridge therebetween. FIG. 7A shows filterwell cartridge holder 60 with a releasably securable dispensing cartridge 71 supported in a dispensing position by lateral extension 75 and 76. Dispensing cartridge holder 60 is shown in a perspective view in FIG. 7B, a back view in FIG. 7D and a top view in FIG. 7E. FIG. 7B and FIG. 7D reveal that filterwell cartridge holder housing 61 includes a first limited flow water port 88 and a second limited flow water port 86 that extend through the dispensing cartridge holder housing 61 while FIG. 7D reveals a water port 95 on one side of dispensing cartridge holder housing 61 and a further water port 94 on the opposite side of dispensing cartridge holder housing 61.

FIG. 7E is a top view of dispensing cartridge holder 60 revealing a first water settling compartment 98, which is located underwater, partially formed by a lower flow ramp 87 and an arcuate sidewall 91 having a top edge 91a with a top of the water settling compartment 98 formable by a bottom end of a dispensing cartridge that is mateable to the top edge 91a of cartridge holder 60. A water port 94 (FIG. 7D) in housing 61 allows water to flow into and out of the bottom of water settling compartment 98 while the sidewall 91 and a dispensing cartridge located thereon inhibit or prevent fast flowing water or turbulent water from directly contacting a dispensing end of the dispensing cartridge that is engagement with top edge 91a to thereby inhibit or prevent an unwanted changing of the cartridge dispensing rate due to variable flow past the dispensing end of a dispensing cartridge located thereon.

Similarly, dispensing cartridge holder 60 includes a second water settling compartment 99, which is located underwater, partially formed by a lower flow ramp 89 and an arcuate sidewall 90 having a top edge 90a with a top of the water settling compartment 99 formable by a bottom end of a further dispensing cartridge that is mateable to the top edge 90a of cartridge holder 60. A water port 95 (FIG. 7D) in housing 61 allows water to flow into and out of the bottom of compartment 99 while the sidewall 90 and the dispensing cartridge located therein inhibit or prevent fast flowing or turbulent water from directly contacting a dispensing end of the dispensing cartridge engaged with the top edge 90a of the water settling compartment 99 to thereby inhibit or prevent changing of the cartridge dispensing rate.

FIG. 7A shows a dispensing cartridge 71 positioned on top of sidewall 90 to form a top to the water settling compartment 99 (FIG. 7E) to thereby isolate a dispensing end of dispensing cartridge 71 from the effect of turbulent flow as well as direct flow past the dispensing end of the dispensing cartridge 71 that delivers the dispersant through variable openings in a bottom end of the dispensing cartridge. For example, turbulent flow or changes in the flow of water proximate a dispensing end of a dispensing cartridge may alter the dispensing rate of the dispensing cartridge. In this example the first water settling compartment 98 comprise a bottom flow ramp 87 and an arcuate sidewall 91 having a top edge 91*a* for mating to a bottom end of a dispensing cartridge. Similarly, the second water settling compartment 99 includes a bottom flow ramp 89 and an arcuate sidewall 90 having a top edge 90*a* for mating to a bottom end of a dispensing cartridge mating surface as illustrated in FIG. 7I.

In this example FIG. 7 and FIG. 7*a* show the angled surfaces of arcuate side extensions and flat base face on the left side of housing 60 and the arcuate side extension and flat base face on the right side of the dispensing cartridge holder 60 to laterally engage the adjacent faces of two dispensing cartridges located therein with each of the side extensions spreadable to slidingly insert a dispensing cartridge therebetween and resiliently retractable to sandwichingly support the dispensing cartridge in a dispensing condition therebetween with a backside of the dispensing cartridge also engageable with a back wall of housing 61 to maintain the dispensing cartridge in position as water flows through the filterwell. While the cartridge holder 60 includes resilient extensions with angular surfaces that can mate to a dispenser cartridge other methods of removably securing a dispensing cartridge to the filterwell cartridge holder including mechanical means such as threads or the like may be used without departing from the spirit and the scope of the invention.

In this example the resiliency of the material of filterwell cartridge holder 10 or filterwell cartridge holder 60 allows the filterwell cartridge holder to be attached to a feed pipe on the go. For example, in filterwell cartridge holder 60 the two flat terminal ends 72*a* and 72*b* spread apart and pass around the outside face of feed pipe 24 and then collapse radially to frictionally support the filterwell cartridge holder 60 on feed pipe 24. The type of filterwell cartridge holder attachment is well suitable when the feed pipe 24 extends from a central opening in a horizontal extending water filter 50 and preferably the radius of curvature of feed pipe 24 is approximately the same or the same as the radius of curvature R of the arcuate face 12 to thereby provide an interference fit i.e. clamping engagement with feed pipe 24. Examples of suitable materials for a filterwell cartridge holder are polymer plastics although other materials may be used.

In the example shown both filterwell cartridge holder 10 and filterwell cartridge holder 60 are one-piece holders that have extensions and integral structural features for supporting at least two dispensing cartridges therein while also having end extensions for engaging and supporting the filterwell cartridge holder on a feed pipe located in a filterwell.

Figure 7C:
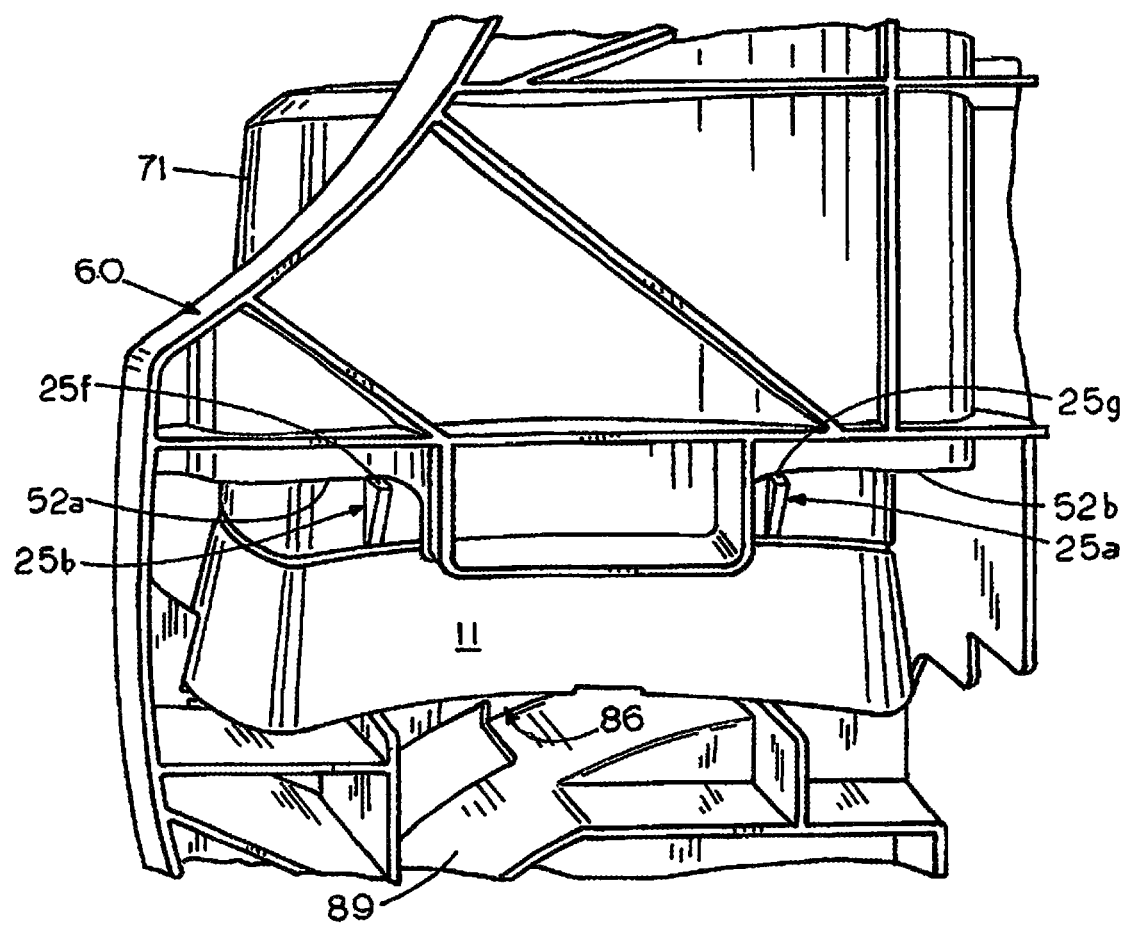
FIG. 7C is a rear view of the cartridge holder of FIG. 7A with a dispensing cartridge secured therein.

FIG. 7C shows a partial view of the filterwell dispenser holder 60, which is positioned on a feed pipe at the end of an elongated water filter cartridge (not shown), with a dispensing cartridge 71 supported on filterwell dispenser holder 60 to enable dispensing of dispersants, such as minerals and a halogen, into a water port 86 through a flow ramp 89, which is located below the end dispensing cartridge 71 that contains bottom or end ports for ingress and egress of water and dispersants therethrough. In this embodiment a rib 25*a* and a rib 25*b* extend outward from the dispensing cartridge 71. Rib 25*a* has a top surface 25*g* to abut lip 52*b* on housing to assist in maintaining dispensing cartridge 70 in a fixed position in the filterwell dispenser holder 60. Similarly, a rib 25*b* extends outward from the dispensing cartridge 71 with a top surface 25*f* abutting a second lip 52*a* on filterwell dispenser holder 60 to further assist in maintaining dispensing cartridge 71 in a fixed condition in the filterwell dispenser holder 60.

FIG. 8 shows a filter engaging stop or extension 85 of filterwell cartridge holder 60 that extends between adjacent pleats 50*a* of a filter cartridge 50 to hold the filterwell cartridge holder 60 in the proper dispensing position, which in this case is in a vertical condition on one end of a water filter cartridge 50. FIG. 8A is a sectional view showing the extension 85 located radially inward between pleats 50*a* of water filter cartridge 50.

FIG. 9 is a side view of the filterwell cartridge holder 60 without dispensing cartridges therein revealing the cantilevered arm 76 extending orthogonally outward from the housing 61 and split flange 62 having a thickness T for insertion between a space at the end of a water filter cartridge.

In a method described herein one can on-the-go secure a filterwell dispenser holder and dispensing cartridges in a hot tub filterwell through yieldable attachment of one end of filterwell cartridge holder to a feed pipe 24, which is located in a hot tub filterwell, by merely grasping the filterwell dispenser holder 60 and pushing downward thereon to bring a flat arcuate extension 72*a* and a flat arcuate extension 72*b* on the opposite end of the filterwell cartridge holder into face to face frictional engagement around the exterior surface of a cylindrical feed pipe 24.

Thus, a feature of the invention is that a first dispensing cartridge can be grasped and laterally inserted or removed between a set of arcuate resilient extensions that are cantilevered and laterally extending outward from the housing and a second dispensing cartridge that can also be grasped and laterally inserted or removed between a further set of arcuate resilient extensions and that are also cantilevered and laterally extending outward from the housing. In this example, two dispensing cartridges are independently attachable or releasable from the housing through hand engagement with the dispersants from dispensers released directly into the water in filterwell since at least the dispensing end of the dispensing cartridges are maintained below the water line within the filterwell of a hot tub or the like.

A further feature of the invention is that the housing on a dispenser cartridge holder can interact with a bottom face of dispensing cartridge to form a water settling compartment there below that can isolate water proximate a dispensing end of a dispensing cartridge to thereby inhibit or prevent unwanted changes in a cartridge dispensing rate do to flow changes within the filterwell of hot tub or spa.

We claim:

1. A filterwell cartridge holder mountable within a hot tub filterwell with the filterwell cartridge holder comprising:
   a housing including a dispensing cartridge compartment located thereon;
   a top end of said housing; and
   a feed pipe connector on an opposite end of said housing where the feed pipe connector can be brought into or out of engagement with a feed pipe located in the hot tub filterwell.

2. The filterwell cartridge holder of claim 1 wherein the feed pipe connector includes a first extension and a second extension each resiliently yieldable to allow the feed pipe connector to be slidingly forced into or out of engagement with a filterwell feed pipe.

3. The filterwell cartridge holder of claim 2 wherein the first extension and the second extension each have an arcuate face.

4. The filterwell cartridge holder of claim 3 wherein at least one of the first extension or the second extension includes a canted end face for engagement with the filterwell feed pipe as the housing is slidingly forced into engagement with the filterwell feed pipe.

5. The filterwell cartridge holder of claim 3 wherein a distance x between an end of the first extension and the second extension is less than a diameter of the filterwell feed pipe.

6. The filterwell cartridge holder of claim 1 wherein the dispensing cartridge compartment on said housing includes a set of resilient lateral extensions for hand engagement or disengagement with a dispensing cartridge.

7. The filterwell cartridge holder of claim 1 wherein the filterwell dispensing cartridge holder includes at least two arcuate resilient extensions each having a face for angularly engaging adjacent faces of a dispensing cartridge for securement of the dispensing cartridge therebetween.

8. The filterwell cartridge holder of claim 7 wherein the housing includes a ledge for supporting a portion of a bottom face of the dispensing cartridge.

9. The filterwell cartridge holder of claim 7 wherein at least one of the arcuate resilient extensions includes a flat base face and an arcuate side face for simultaneously engaging two faces of a dispensing cartridge wherein the two faces of the dispensing cartridge are located at an acute angle to each other.

10. The filterwell cartridge holder of claim 1 wherein the filterwell dispensing cartridge holder comprises a one piece molded polymer plastic.

11. The filterwell cartridge holder of claim 1 including a stop radially insertable between adjacent pleats in a water cartridge filter located proximate the filterwell cartridge holder.

12. The filterwell cartridge holder of claim 1 including a sidewall and a flow ramp forming a portion of a water settling compartment and an end of a dispensing cartridge form a further portion of the water settling compartment.

13. The filterwell cartridge holder of claim 1 including at least two water settling compartments located thereon.

14. A filterwell cartridge holder comprising a housing having:
a set of arcuate end extensions extending over 180 degrees for being brought into forced engagement with a feed pipe through radial separation of the set of arcuate end extensions and brought into clamping engagement with the feed pipe through a resiliency of the set of arcuate end extensions;
a first set of lateral extensions each having a flat base for supporting a flared base of a dispensing cartridge therein with each of first set of lateral extensions mateable with the flared base of a dispensing cartridge located therebetween;
a second set of lateral extensions each having a flat base for supporting a flared base of a further dispensing cartridge therein with each of the second set of lateral extension mateable with the flared base of the further dispensing cartridge located therebetween;
a one end of the dispenser holder for lifting the filterwell cartridge holder out of engagement with a filterwell feed pipe or forcing the filterwell cartridge holder into engagement with the filterwell pipe; and
an extension extending from said filterwell cartridge holder with said extension insertable between adjacent pleats of a water filter cartridge to assist in maintaining a fixed orientation of the filterwell cartridge holder with respect to the water filter cartridge during operation of the water filter cartridge but not so far between the adjacent pleats so as to prevent rotation of the water filter cartridge with respect to the filterwell cartridge holder in the event an operator wants to rotate the water filter cartridge with respect to the filterwell cartridge holder.

15. A method of securing a dispensing cartridge in a hot tub filterwell comprising;
yieldably attaching a one end of a filterwell cartridge holder housing to a feed pipe in the hot tub filterwell while holding onto an opposite end of the filterwell cartridge holder housing; and
yieldably attaching the dispensing cartridge to the filterwell cartridge holder housing through engaging a set of adjacent faces of the dispensing cartridge with a set of resilient extensions on the filterwell cartridge holder.

16. The method of claim 15 including bringing the set of adjacent faces of the dispensing cartridge into face-to-face engagement with a set of mating faces on the filterwell cartridge holder.

17. The method of claim 15 wherein the step of securing the dispensing cartridge in the hot tub filterwell includes lateral insertion of the dispensing cartridge between a set of arcuate resilient extensions cantilevered laterally outward from the housing.

18. The method of claim 15 including inserting an extension of the filterwell cartridge holder between a set of pleats on a water cartridge filter located proximate the filterwell cartridge holder.

19. The method of claim 15 wherein engaging a set of adjacent faces of the dispensing cartridge comprises resiliently engaging a first face and a second face on the dispensing cartridge with a set of extensions on the filterwell cartridge holder where the first face and the second face on the dispensing cartridge and the set of resilient extensions on the filterwell cartridge holder each have adjacent faces located at an acute angle to each other.

20. The method of claim 15 including abutting a back face of the dispensing cartridge against a face of the filterwell cartridge holder.

21. The method of claim 15 wherein the the step of yieldably attaching a one end of a filterwell cartridge housing to a feed pipe comprises: engaging a canted end on an arcuate extension to an exterior surface of the feed pipe to flex the arcuate extension outward for insertion of the feed pipe into engagement with the set of resilient extensions.

22. The method of claim 15 including engaging a first socket on a filterwell cartridge holder to a first side of a dispensing cartridge and a second socket of the filterwell cartridge holder to an opposite side of the dispensing cartridge to secure the dispensing cartridge in a fixed position on the filterwell cartridge holder.

23. A filterwell cartridge holder mountable within a hot tub filterwell with the filterwell cartridge holder comprising:
a housing including a dispensing cartridge compartment located thereon and at least one water port to allow passage of water through the housing; and
a feed pipe connector on an end of said housing where the feed pipe connector can be brought into or out of engagement with a feed pipe located in the hot tub filterwell through displacement of the feed pipe connector with respect to a filterwell feed pipe.

24. The filterwell cartridge holder of claim 23 wherein the feed pipe connector includes a first flat extension and a second flat extension each resiliently yieldable to allow the feed pipe connector to be slidingly forced into or out of engagement with the filterwell feed pipe mounted in a filterwell.

25. The filterwell cartridge holder of claim 23 including a flow ramp in said housing with the flow ramp directing water away from an end of a dispensing cartridge supported on the filterwell cartridge holder.

26. The filterwell cartridge holder of claim 23 wherein the filterwell cartridge holder includes an integral lip for engagement with a rib on a dispensing cartridge to assist in maintaining the dispensing cartridge on the cartridge holder.

27. The filterwell cartridge holder of claim 23 wherein the filterwell cartridge holder includes at least two dispensing cartridge compartments and the filterwell cartridge holder comprises a one piece molded housing.

28. The filterwell cartridge holder of claim 23 wherein the dispensing cartridge housing includes at least two flow ramps for directing water away from an end of a pair of dispensing cartridges located in said cartridge holder and at least two water ports therein for directing the water through the filterwell cartridge holder.

29. The filterwell cartridge holder of claim 23 wherein the filterwell cartridge holder includes at least two arcuate resilient extensions each having a face for angularly engaging adjacent faces of a dispensing cartridge for securement of the dispensing cartridge therebetween and an extension for insertion between a set of pleats of a water filter cartridge to maintain the orientation of the filterwell cartridge holder with respect to the water filter cartridge.

\* \* \* \* \*